(12) United States Patent
Cho

(10) Patent No.: US 6,950,736 B2
(45) Date of Patent: Sep. 27, 2005

(54) SHIFT CONTROL METHOD AND APPARATUS OF AN AUTOMATIC TRANSMISSION

(75) Inventor: Young Shin Cho, Ansan (KR)

(73) Assignee: Hydundai Motor Company, Seoul (KR)

( * ) Notice: Subject to any disclaimer, the term of this patent is extended or adjusted under 35 U.S.C. 154(b) by 241 days.

(21) Appl. No.: 10/627,789

(22) Filed: Jul. 24, 2003

(65) Prior Publication Data

US 2005/0075776 A1 Apr. 7, 2005

(30) Foreign Application Priority Data

Nov. 28, 2002 (KR) .................................. 10-2002-0074859

(51) Int. Cl.[7] .............................................. F16H 61/12
(52) U.S. Cl. ............................ 701/62; 477/15; 477/75; 477/68; 477/126; 475/131; 475/169
(58) Field of Search ............................. 701/62, 34, 51; 477/15, 68, 75, 126, 117, 115, 98, 203, 46, 109, 110; 475/131, 169

(56) References Cited

U.S. PATENT DOCUMENTS

| | | | | |
|---|---|---|---|---|
| 5,211,082 A | * | 5/1993 | Sasaki et al. ............... | 475/119 |
| 5,598,334 A | * | 1/1997 | Shin et al. ................... | 701/51 |
| 5,749,802 A | * | 5/1998 | Tanahashi et al. .......... | 475/120 |
| RE37,469 E | * | 12/2001 | Toukura ...................... | 477/47 |
| 6,494,808 B2 | * | 12/2002 | Lee ............................. | 477/94 |
| 6,827,667 B2 | * | 12/2004 | Kim ........................... | 477/112 |
| 2002/0087239 A1 | * | 7/2002 | Kwon ......................... | 701/34 |

FOREIGN PATENT DOCUMENTS

| | | |
|---|---|---|
| JP | 05-025778 | 2/1993 |
| KR | 1019970003560 A | 3/1997 |

* cited by examiner

*Primary Examiner*—Thomas G. Black
*Assistant Examiner*—Tuan C To
(74) *Attorney, Agent, or Firm*—Morgan Lewis & Bockius LLP

(57) ABSTRACT

In the case of malfunctioning of an inhibitor switch of an automatic transmission, a current vehicle speed is compared with a maximum vehicle speed of a reverse speed when the current vehicle speed is other than 0. The transmission is then controlled to a target shift-speed determined on the basis of vehicle driving state parameters, when the current vehicle speed is higher than the maximum vehicle speed of the reverse speed.

8 Claims, 2 Drawing Sheets

SHIFT CONTROL METHOD AND APPARATUS OF AN AUTOMATIC TRANSMISSION

FIELD OF THE INVENTION

Generally, the present invention relates to a shift control method and apparatus of an automatic transmission. More particularly, the present invention relates to a shift control method and apparatus that enables a shifting operation when an inhibitor switch is malfunctioning.

BACKGROUND OF THE INVENTION

The term "inhibitor switch" is hereinafter used to mean "a sensor for detecting a shift range designated by a driver", and therefore should be understood to have that meaning.

An automatic transmission for a vehicle automatically engages an appropriate shift-speed on the basis of parameters related to driving states of a vehicle, such as vehicle speed and throttle opening. An automatic transmission for a vehicle is usually provided with a shift lever by which a driver can designate a desired shift range such as "P", "R", "N", "D", "2", and "L".

A manual valve of the automatic transmission is repositioned according to operation of the shift lever, and accordingly, the automatic transmission forms hydraulic control lines appropriate for the position of the shift lever. The position of the manual valve is detected by an inhibitor switch, and the detected position is transmitted to a transmission control unit (TCU) that controls overall operation of the transmission. Accordingly, the TCU controls hydraulic pressure supply to engage an appropriate shift-speed at the shift range designated by the driver.

In the case of malfunctioning of the inhibitor switch, such as a case in which no signal is generated at the inhibitor switch due to, e.g., broken circuits, the TCU controls the automatic transmission in a mode that can keep the vehicle running. Such a control mode is frequently called a Limp-Home mode.

According to the prior art regarding such a Limp-Home mode, the TCU usually controls the automatic transmission under the supposition that the last received signal from the inhibitor switch is still being received.

According to such a control method in a Limp-Home mode of the prior art, the vehicle can keep running at a fixed shift-speed, but shifting operation among a plurality of forward shift-speeds on the basis of vehicle parameters such as vehicle speed and throttle opening is disabled.

For example, in the case that the inhibitor switch malfunctions while the shift lever is moved from neutral N range to drive D range, the last received signal from the inhibitor switch indicates the N range, while the manual valve is repositioned to the drive D range.

In this case, hydraulic pressure can be supplied to friction elements for a specific shift-speed and therefore the specific speed may be engaged, since the manual valve is actually positioned to the drive D range. However, shifting operation from the specific shift-speed to another shift-speed is disabled, because the TCU regards the current position of the shift lever as fixed to the N range and accordingly it does not generate signals for shifting. Accordingly the vehicle can only run at the specific shift-speed.

In the case that a vehicle can only run at a fixed shift-speed in such a Limp-Home mode, the transmission cannot sufficiently provide appropriate operation for a wide range of vehicle speeds. For example, when the transmission is fixed to a lower gear such as a second forward speed, the vehicle cannot run at high speed since the engine speed is limited. When the transmission is fixed to a higher gear such as a fourth forward speed, the vehicle suffers from lack of driving power in a low vehicle speed.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

An exemplary shift control apparatus of an automatic transmission according to an embodiment of the present invention includes an inhibitor switch for detecting a shift range designated by a driver, a vehicle speed detector for detecting a vehicle speed, an accelerator position detector for detecting a degree of accelerator operation, actuators for executing shifting operation of the automatic transmission, and a transmission control unit for controlling the actuators based on a target shift-speed that is determined on the basis of input signals from the inhibitor switch, the vehicle speed detector, and the accelerator position detector.

The transmission control unit executes a set of instructions, the set of instructions comprising instructions for steps of a shift control method of the present invention.

An exemplary shift control method of an automatic transmission according to an embodiment of the present invention includes determining if an inhibitor switch is malfunctioning, detecting a current vehicle speed when the inhibitor switch is malfunctioning, determining if the current vehicle speed equals 0, obtaining a maximum vehicle speed of the reverse R range when the current vehicle speed does not equal 0, comparing the current vehicle speed with the maximum vehicle speed of the reverse R range, determining a target shift-speed on the basis of vehicle driving state parameters when the current vehicle speed is higher than the maximum speed of the reverse R range, and controlling actuators of the transmission such that the target shift-speed is engaged.

In a further embodiment, in the determining of the target shift-speed, the target shift-speed is selected from shift-speeds of the transmission excluding the first forward speed.

In another further embodiment, the vehicle driving state parameters include a vehicle speed and a degree of accelerator operation.

In a yet further embodiment, the shift control method further includes determining, in the case that the inhibitor switch is malfunctioning, if other sensors or the actuators of the transmission are malfunctioning, and determining the target shift-speed as a predetermined shift-speed when other sensors or the actuators of the transmission are malfunctioning such that the predetermined shift-speed is engaged by the control of actuators.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will hereinafter be described in detail with reference to the accompanying drawings.

Figure 1:
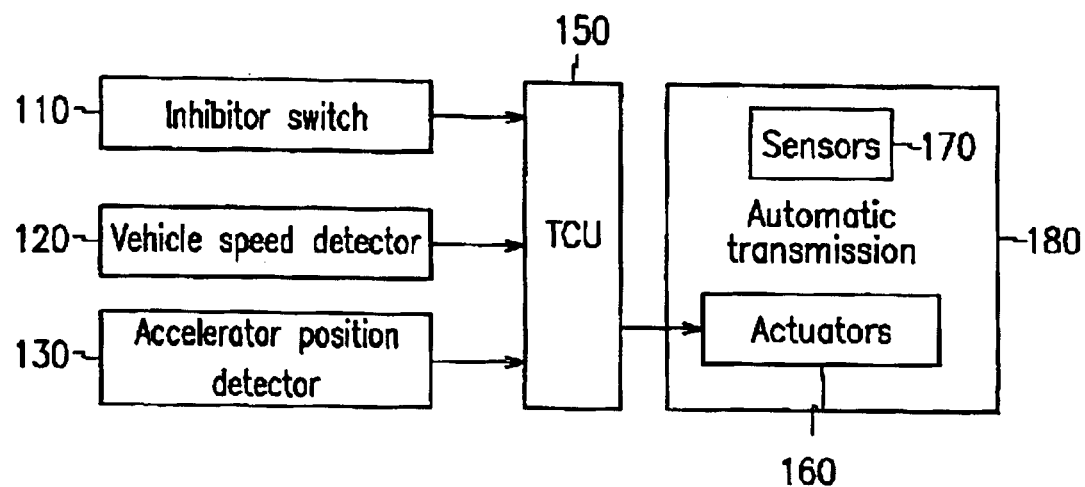
FIG. 1 is a block diagram of a shift control apparatus of an automatic transmission for a vehicle according to a preferred embodiment of the present invention.

As shown in FIG. 1, a shift control apparatus of an automatic transmission for a vehicle according to a preferred embodiment of the present invention includes an inhibitor switch 110 for detecting a shift range designated by a driver, a vehicle speed detector 120 for detecting vehicle speed, an accelerator position detector 130 for detecting a degree of accelerator operation, actuators 160 for executing shifting operations of an automatic transmission 180, and a transmission control unit (TCU) 150 for controlling the actuators 160 based on a target shift-speed that is determined on the basis of input signals from the inhibitor switch 110, the vehicle speed detector 120, and the accelerator position detector 130

The inhibitor switch 110 may be realized in a manner that is already known to a person of ordinary skill in the art.

The vehicle speed detector 120 may be realized as a sensor that detects rotation speed of an output shaft of the automatic transmission, however, it is not limited thereto.

The accelerator position detector 130 may be realized as a sensor that detects the degree of accelerator operation. Alternatively, in the case that the automatic transmission is to be engaged with an engine equipped with a throttle valve, it may be realized as a sensor that detects the throttle valve opening.

The actuators 160 may be variously designed depending on detailed specifications of the automatic transmission. However, when the detailed specifications of the automatic transmission are determined, the corresponding actuators of the transmission become obvious.

The TCU 150 can be realized by one or more processors activated by predetermined software, and the predetermined software can be programmed to perform each step of a shift control method according to a preferred embodiment of the present invention.

Figure 2:
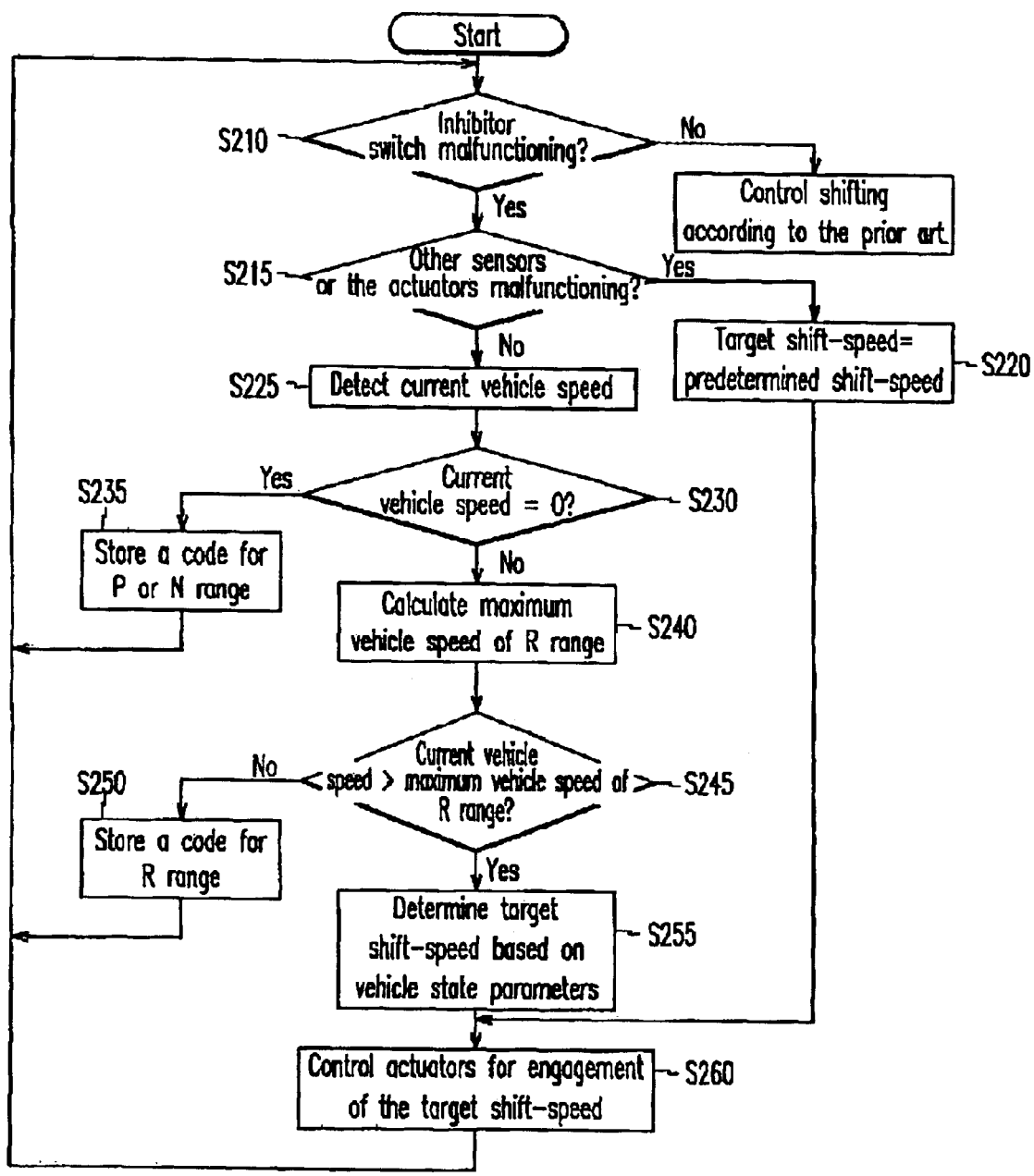
FIG. 2 is a flowchart showing a shift control method of an automatic transmission for a vehicle according to a preferred embodiment of the present invention.

As shown in FIG. 2, firstly at step S210, the TCU 150 determines whether the inhibitor switch 110 is malfunctioning. The malfunctioning of the inhibitor switch 110 is determined, e.g., on the basis of whether a signal is being received from the inhibitor switch 110.

When the inhibitor switch 110 is determined to be correctly functioning, the TCU 150 controls the automatic transmission 180 according to the prior art.

When the inhibitor switch 110 is determined to be malfunctioning, the TCU 150 additionally determines at step S215 whether any other sensor 170 or actuators 160 of the automatic transmission 180 except the inhibitor switch 110 are malfunctioning. The malfunctioning of the sensor 170 and the actuators 160 may be determined, e.g., on the basis of whether any signal is received therefrom.

When the sensor 170 or the actuators 160 are determined to be malfunctioning, the TCU 150 sets a target shift-speed to a predetermined shift-speed at step S220. The predetermined shift-speed can be selected from the allowable shift-speed of the transmission according to a person of ordinary skill in the art on the basis of his/her designing strategy, and for example, the predetermined shift-speed may be a third forward speed.

When the sensor 170 and the actuators 160 are determined to be correctly functioning at step S215, the TCU 150 detects a current vehicle speed by the vehicle speed detector 120 at step S225, and subsequently determines if the detected current vehicle speed equals zero (0) at step S230.

The vehicle speed value of 0 implies that the vehicle is stopped, and therefore, assuming that the actual shift range is a parking P or neutral N range is not believed to cause any harm in controlling the shift operation of the automatic transmission 180.

Therefore, in this case, the TCU 150 stores a predetermined code that implies a current shift range of the parking P or neutral N range at step S235, and then returns to the step S210 of determining malfunctioning of the inhibitor switch 110 such that the shift control method of the present embodiment is recursively executed.

When the current vehicle speed does not equal zero (0) at step S230, the TCU 150 calculates a maximum vehicle speed of the reverse R range at step S240. The maximum vehicle speed may be calculated according to the following equation.

$$\text{Vehicle speed [km/h]} = \frac{\text{engine speed [rpm]} \times 60 \times 2\pi \times \text{tire radius [m]}}{\text{final gear ratio} \times \text{reverse gear ratio} \times 1000}$$

Corresponding units are shown in brackets in the above equation.

In the above equation, the final gear ratio, the reverse gear ratio, and the tire radius is fixed when the vehicle is manufactured. Therefore, the vehicle speed is found when the engine speed is determined. The maximum vehicle speed at the reverse R range is also found according to an allowed maximum engine speed at the range. The maximum engine speed may depend on and is fixed according to specifications of an engine to which the automatic transmission is engaged.

At the step S240, the maximum vehicle speed may be calculated using the equation, every time the step S240 is executed. Alternatively, the TCU 150 may recall the value of the maximum vehicle speed that was once calculated using the above equation, since the maximum vehicle speed at the reverse R range does not vary based on the driving states of the vehicle.

When the maximum vehicle speed at the reverse R range is obtained at step S240, the TCU 150 compares the current vehicle speed with the maximum vehicle speed of the reverse R range at step S245.

When the current vehicle speed is not higher than the maximum vehicle speed of the reverse R range at step S245, a current shift range may actually be in the reverse R range. Therefore in this case, the TCU 150 stores, at step S250, a code corresponding to a state that the current shift range is the reverse R range. The TCU 150 then returns to the step S210 of determining malfunctioning of the inhibitor switch 110 such that the shift control method of the present embodiment is recursively executed.

When the current vehicle speed is higher than the maximum vehicle speed of the reverse R range, the TCU 150 determines a target shift-speed at step S255 on the basis of vehicle driving state parameters.

The step S255 is adopted to enable shifting between different shift-speeds on the basis of a target shift-speed determined based on the vehicle driving state, not having to fix the actual shift-speed to a specific speed.

A shift pattern of an automatic transmission usually uses parameters of vehicle speed and accelerator position (or equivalently, throttle opening). Therefore, the vehicle driving state parameters preferably include the vehicle speed and accelerator position (or throttle opening) such that a normal shift pattern can be enabled against the case of malfunctioning of the inhibitor switch.

Preferably, the target shift-speed at step S255 is selected from shift-speeds of the transmission excluding the first forward speed. That is, the target shift-speed determined at the step S255 may have any shift-speed except a first forward speed. The reasons for excluding the first speed from allowable target speeds at step S255 are as follows.

First, in the case that the transmission has its speed ratio of reverse speed less than that of the first forward speed, the maximum vehicle speed of the reverse speed is higher than that of the first forward speed. In this case, there is no situation in which the transmission will shift to the first speed if the current vehicle speed is higher than the maximum vehicle speed of the reverse speed.

Second, even in the case that the speed ratio of the reverse speed is a little higher than that of the first forward speed, shifting to the first speed at the vehicle speed higher than the maximum speed of the reverse speed may cause overload to the engine and/or transmission.

When the target shift-speed is determined at the step S220 or S255, the TCU 150 controls the actuators 160 such that the target shift-speed is engaged at step S260.

At the step S260, the transmission will remain at a current shift-speed if the current shift-speed equals the target shift-speed, and on the contrary, the transmission will perform a shifting operation to the target shift-speed if the current shift-speed does not equal the target shift-speed.

According to a preferred embodiment of the present invention, shifting between forward speeds is enabled in the case of malfunctioning of the inhibitor switch, and accordingly, performance of an automatic transmission when such a malfunction occurs is improved.

In more detail, up-shifting is enabled such that an excessive increase of the engine speed according to an increase of vehicle speed may be prevented, and accordingly durability of the engine and/or the transmission is enhanced. In addition, running of the vehicle at a high speed is enabled due to the enablement of up-shifting.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A shift control method of an automatic transmission, comprising:
   determining if an inhibitor switch is malfunctioning;
   detecting a current vehicle speed when the inhibitor switch is malfunctioning;
   determining if the current vehicle speed equals 0;
   obtaining a maximum vehicle speed of the reverse R range when the current vehicle speed does not equal 0;
   comparing the current vehicle speed with the maximum vehicle speed of the reverse R range;
   determining a target shift-speed on the basis of vehicle driving state parameters when the current vehicle speed is higher than the maximum speed of the reverse R range; and
   controlling actuators of the transmission such that the target shift-speed is engaged.

2. The shift control method of claim 1, wherein in the determining of the target shift-speed, the target shift-speed is selected from shift-speeds of the transmission excluding the first forward speed.

3. The shift control method of claim 1, wherein the vehicle driving state parameters include a vehicle speed and a degree of accelerator operation.

4. The shift control method of claim 1, further comprising:
   determining, in the case that the inhibitor switch is malfunctioning, if other sensors or the actuators of the transmission are malfunctioning; and
   determining the target shift-speed as a predetermined shift-speed when other sensors or the actuators of the transmission are malfunctioning such that the predetermined shift-speed is engaged by the controlling of actuators.

5. A shift control apparatus of an automatic transmission, comprising:
   an inhibitor switch for detecting a shift range designated by a driver;
   a vehicle speed detector for detecting vehicle speed;
   an accelerator position detector for detecting a degree of accelerator operation;
   actuators for executing shifting operation of the automatic transmission; and
   a transmission control unit for controlling the actuators based on a target shift-speed that is determined on the basis of input signals from the inhibitor switch, the vehicle speed detector, and the accelerator position detector,
   wherein the transmission control unit executes a set of instructions, the set of instructions comprising instructions for:
   determining if an inhibitor switch is malfunctioning;
   detecting a current vehicle speed when the inhibitor switch is malfunctioning;
   determining if the current vehicle speed equals 0;
   obtaining a maximum vehicle speed of the reverse R range when the current vehicle speed does not equal 0;
   comparing the current vehicle speed with the maximum vehicle speed of the reverse R range;
   determining a target shift-speed on the basis of vehicle driving state parameters when the current vehicle speed is higher than the maximum speed of the reverse R range; and
   controlling actuators of the transmission such that the target shift-speed is engaged.

6. The shift control apparatus of claim 5, wherein in the determining of the target shift-speed, the target shift-speed is selected from shift-speeds of the transmission excluding the first forward speed.

7. The shift control apparatus of claim 5, wherein the vehicle driving state parameters include a vehicle speed and a degree of accelerator operation.

8. The shift control apparatus of claim 5, wherein the set of instructions further comprises:
   determining, in the case that the inhibitor switch is malfunctioning, if other sensors or the actuators of the transmission are malfunctioning; and
   determining the target shift-speed as a predetermined shift-speed when other sensors or the actuators of the transmission are malfunctioning such that the predetermined shift-speed is engaged by the controlling of actuators.

* * * * *